US008664165B2

(12) United States Patent
Horton et al.

(10) Patent No.: US 8,664,165 B2
(45) Date of Patent: Mar. 4, 2014

(54) FLUID LOSS PILLS

(75) Inventors: Robert L. Horton, Sugar Land, TX (US); Bethicia B. Prasek, The Woodlands, TX (US)

(73) Assignee: M-I L.L.C., Houston, TX (US)

( * ) Notice: Subject to any disclaimer, the term of this patent is extended or adjusted under 35 U.S.C. 154(b) by 534 days.

(21) Appl. No.: 11/993,683

(22) PCT Filed: Jun. 29, 2006

(86) PCT No.: PCT/US2006/025320
§ 371 (c)(1),
(2), (4) Date: Dec. 21, 2007

(87) PCT Pub. No.: WO2007/005499
PCT Pub. Date: Jan. 11, 2007

(65) Prior Publication Data
US 2010/0004145 A1    Jan. 7, 2010

Related U.S. Application Data

(60) Provisional application No. 60/695,803, filed on Jun. 30, 2005.

(51) Int. Cl.
*C09K 8/10* (2006.01)
*C09K 8/60* (2006.01)
*C02F 5/14* (2006.01)
*C09K 8/74* (2006.01)
*E21B 43/22* (2006.01)
*E21B 43/26* (2006.01)
*E21B 33/13* (2006.01)

(52) U.S. Cl.
USPC ........... 507/216; 507/212; 507/219; 507/235; 507/269; 166/282; 166/283; 166/295

(58) Field of Classification Search
USPC ......... 507/145, 216, 219, 269, 272, 212, 235; 166/282, 283, 295
See application file for complete search history.

(56) References Cited

U.S. PATENT DOCUMENTS

| | | | |
|---|---|---|---|
| 4,552,215 A | 11/1985 | Almond et al. | |
| 5,304,620 A | 4/1994 | Holtmyer et al. | |
| 5,372,732 A | 12/1994 | Harris et al. | |
| 5,439,057 A | 8/1995 | Weaver et al. | |
| 5,680,900 A | 10/1997 | Nguyen et al. | |
| 5,728,652 A * | 3/1998 | Dobson et al. | 507/145 |
| 5,785,747 A * | 7/1998 | Vollmer et al. | 106/194.2 |
| 5,996,694 A | 12/1999 | Dewprashad et al. | |
| 6,004,475 A | 12/1999 | Verma et al. | |
| 6,342,467 B1 | 1/2002 | Chang et al. | |
| 6,620,341 B1 * | 9/2003 | Verma et al. | 252/389.54 |
| 2008/0039347 A1 | 2/2008 | Welton et al. | |

FOREIGN PATENT DOCUMENTS

| | | |
|---|---|---|
| CA | 1316340 C | 4/1993 |
| CA | 2167003 A1 | 8/1996 |
| EP | 0673985 | 9/1995 |
| EP | 0726302 | 8/1996 |
| EP | 0749697 A1 | 12/1996 |

OTHER PUBLICATIONS

SPE 29525, "A New Enviromentally Safe Crosslinked Polymer for Fluid Loss Control", Cole et.al., Apr. 1995.*
Canadian Office Action issued in Application No. 2,613,861 dated Aug. 18, 2009 (4 pages).
EP Communication dated Sep. 17, 2009 issued in EP Application No. 06785815.9 (6 pages).
PCT International Search Report dated Oct. 31, 2006 issued in PCT/US2006/025320 (4 pages).
PCT Written Opinion dated Oct. 31, 2006 issued in PCT/US2006/025320 (5 pages).
EP Communication dated Oct. 20, 2008 issued in EP Application No. 06785815.9 (5 pages).
Office Action issued in related Chinese Application No. 200680024010.2; dated Mar. 1, 2010 (7 pages).
Office Action issued in corresponding Chinese Application No. 200680024010.2 dated Dec. 29, 2011 (6 pages).
Office Action issued in corresponding Mexican Application No. MX/a/2008/000063 dated Oct. 5, 2011 (9 pages).
Office Action issued in corresponding Mexican Application No. MX/a/2008/000063 dated Mar. 26, 2012 (11 pages).
Communication pursuant to Article 94(3) EPC issued Feb. 6, 2013 in corresponding European Patent Applicaiton 06785815.9 (11 pages).
D.P. Vollmer et al.; "Brine and Permeability Effects on Crosslinked Fluid-Loss Pill Filter-Cake Formation"; SPE 93319; Feb. 2005 (5 pages).
F.F. Chang et al.; "Development of a New Crosslinked-HEC Fluid Loss Control Pill for Highly-Overbalanced, High-Permeability and/or High Temperature Formations"; SPE 39438; Feb. 1998 (13 pages).
M. Parlar, et al; "Guidelines for Selection of Fluid Loss Control Methods Before and After Sand Control Treatments to Maximize Well Productivity and Cost-Effectiveness"; SPE 39460; Feb. 1998 (16 pages).
Liqun Han, et al.; "Effects of Various Parameters on Perforation Plugging and Perforation Cleanup"; SPE 31090 (21 pages).
Correspondence reporting Official Action issued Oct. 15, 2012 in corresponding Mexican application No. MX/a/2008/000063 (5 pages).
Office Action issued in corresponding Chinese Application No. 200680024010.2 (w/translation) dated Jun. 27, 2013 (11 pages).
Office Action issued in European Application No. 06785815.9 dated Aug. 9, 2010. (7 pages).

* cited by examiner

Primary Examiner — Aiqun Li
(74) Attorney, Agent, or Firm — Osha • Liang LLP

(57) ABSTRACT

A fluid loss pill that includes a crosslinked polymer gel, a brine, and solid salt particles disposed in said gel is described. Further, a method for reducing fluid loss that includes pumping a selected amount of a fluid loss pill into a wellbore leading to an oil-, condensate-, or gas-producing formation, the fluid loss pill including a crosslinked polymer gel, a brine, and solid salt particles disposed in said gel is described.

16 Claims, No Drawings

FLUID LOSS PILLS

This application claims priority under 35 U.S.C. §119(e) to U.S. Application Ser. No. 60/695,803 filed Jun. 30, 2005. That application is incorporated by reference in its entirety.

BACKGROUND OF INVENTION

1. Field of the Invention

The present invention relates generally to strategies for controlling fluid loss, and the formulation and use of fluid loss pills for use in oilfield applications.

2. Background Art

When drilling or completing wells in earth formations, various fluids typically are used in the well for a variety of reasons. The fluid often is water-based. For the purposes herein, such fluid will be referred to as "well fluid." Common uses for well fluids include: lubrication and cooling of drill bit cutting surfaces while drilling generally or drilling-in (i.e., drilling in a targeted petroliferous formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, minimizing fluid loss into the formation after the well has been drilled and during completion operations such as, for example, perforating the well, replacing a tool, attaching a screen to the end of the production tubulars, gravel-packing the well, or fracturing the formation in the vicinity of the well, displacing the fluid within the well with another fluid, cleaning the well, testing the well, fluid used for emplacing a packer, abandoning the well or preparing the well for abandonment, and otherwise treating the well or the formation.

Brines (such as, for example, aqueous $CaBr_2$) commonly are used as well fluids because of their wide density range and the fact that brines are typically substantially free of suspended solids. In addition, brines are often used in order to achieve a suitable density for use in well-drilling operations. Typically, the brines comprise halide salts of mono- or divalent cations, such as sodium, potassium, calcium, and zinc. Chloride-based brines of this type have been used in the petroleum industry for over 50 years; bromide-based brines, for at least 25 years; and formate-based brines, for only roughly the past ten years. One additional advantage of using brines is that brines typically do not damage certain types of downhole formations; and for formations that are found to interact adversely with one type of brine, often there is another type of brine available with which that formation will not interact adversely.

A variety of compounds are typically added to brine-based well fluids. For example, a brine-based well fluid may also include viscosifiers, corrosion inhibitors, lubricants, pH control additives, surfactants, solvents, and/or weighting agents, among other additives. Some typical brine-based well fluid viscosifying additives include natural polymers and derivatives thereof such as xanthan gum and hydroxyethyl cellulose (HEC). In addition, a wide variety of polysaccharides and polysaccharide derivatives may be used, as is well known in the art.

Some synthetic polymer and oligomer additives such as poly(ethylene glycol) (PEG), poly(diallyl amine), poly(acrylamide), poly(acrylonitrile), poly(aminomethylpropylsulfonate[AMPS]), poly(vinyl acetate), poly(vinyl alcohol), poly(vinyl amine), poly(vinyl sulfonate), poly(styryl sulfonate), poly(acrylate), poly(methyl acrylate), poly(methacrylate), poly(methyl methacrylate), poly(vinylpyrrolidone), poly(vinyl lactam), and co-, ter-, and quater-polymers of the following co-monomers: ethylene, butadiene, isoprene, styrene, divinylbenzene, divinyl amine, 1,4-pentadiene-3-one (divinyl ketone), 1,6-heptadiene-4-one (diallyl ketone), diallyl amine, ethylene glycol, acrylamide, AMPS, acrylonitrile, vinyl acetate, vinyl alcohol, vinyl amine, vinyl sulfonate, styryl sulfonate, acrylate, methyl acrylate, methacrylate, methyl methacrylate, vinylpyrrolidone, and vinyl lactam are also often used as viscosifiers.

One example of how a brine-based well fluid may be used in combination with the above listed polymers and oligomers is set forth below. When drilling progresses to the depth of penetrating a hydrocarbon bearing formation, special care may be required to maintain the stability of the wellbore. Examples of formations in which stability problems often arise include highly permeable and/or poorly consolidated formations. In these types of formations, a drilling technique known as "under-reaming" may be used. In under-reaming, the wellbore is drilled to penetrate the hydrocarbon bearing zone using conventional techniques. A casing generally is set in the wellbore to a point just above the hydrocarbon bearing zone. The hydrocarbon bearing zone then may be re-drilled, for example, using an expandable under-reamer that increases the diameter of the already-drilled wellbore below the casing.

Under-reaming is usually performed using special "clean" drilling fluids. Typical drilling fluids used in under-reaming are expensive, aqueous, dense brines that are viscosified with a gelling and/or crosslinked polymer to aid in the removal of formation cuttings. The high permeability of the target formation, however, may allow large quantities of the drilling fluid to be lost into the formation. Once the drilling fluid is lost into the formation, it becomes difficult to remove. Calcium and zinc bromide brines can form highly stable, acid insoluble compounds when reacted with the formation or substances contained therein. This reaction may reduce the permeability of the formation to any subsequent out-flow of targeted hydrocarbons. One of the most effective ways to prevent such damage to the formation is to limit fluid loss into the formation.

Providing effective fluid loss control without damaging formation permeability in completion operations has been a prime requirement for an ideal fluid loss-control pill. Conventional fluid loss control pills include oil-soluble resins, calcium carbonate, and graded salt fluid loss additives that have been used with varying degrees of fluid loss control. These pills achieve their fluid loss control from the presence of solvent-specific solids that rely on filter-cake build up on the face of the formation to inhibit flow into and through the formation. However, these additive materials can cause severe damage to near-wellbore areas after their application. This damage can significantly reduce production levels if the formation permeability is not restored to its original level. Further, at a suitable point in the completion operation, the filter cake must be removed to restore the formation's permeability, preferably to its original level.

A major disadvantage of using these conventional fluid loss additives is the long periods of clean-up required after their use. Fluid circulation, which in some cases may not be achieved, is often required to provide a high driving force, which allows diffusion to take place to help dissolve the concentrated build up of materials. Graded salt particulates can be removed by circulating unsaturated salt brine to dissolve the particles. In the case of a gravel pack operation, if this occurs before gravel packing, the circulating fluid often causes sloughing of the formation into the wellbore and yet further loss of fluids to the formation.

If removal is attempted after the gravel pack, the gravel packing material often traps the particles against the formation and makes removal much more difficult. Other particulates, such as the carbonates can be removed with circulation of acid, however, the same problems may arise. Oil-soluble resins, carbonate and graded salt particulate will remain isolated in the pores of the formation unless they are in contact with solvent. In the cases where the solid materials cover a long section of wellbore, the rapid dissolution by solvent causes localized removal. Consequently, a thief zone forms and the majority of the solvent leaks through the thief zone instead of spreading over the entire wellbore length.

The use of conventional gel pills such as linear viscoelastic or heavy metal-crosslinked polymers in controlling fluid loss requires pumping the material through large-diameter tubing because of high friction pressures. These materials are typically prepared at the well site.

Among the linear polymers used to form fluid loss control pills is hydroxyethylcellulose (HEC). HEC is generally accepted as a polymer fluid affording minimal permeability damage during completion operations. Normally, HEC polymer solutions do not form rigid gels, but control fluid loss by a viscosity-regulated mechanism. Such polymer fluids may penetrate deeper into the formation than crosslinked polymers. Permeability damage may increase with increasing penetration of such viscous fluids.

According to conventional wisdom, in high permeability reservoirs, a highly crosslinked gel is needed to achieve good fluid loss control. Though HEC is known for its low residue content, it is difficult to crosslink particularly in regards to on-site or in situ formulations. However, according to M. E. Blauch, et al., in SPE 19752, "Fluid Loss Control Using Crosslinkable HEC in High-Permeability Offshore Flexure Trend Completions," pages 465-476 (1989), while there are chemical methods to crosslink standard HEC, these methods have generally been found to be inapplicable to most completion practices.

Therefore, much effort has been expended to modify HEC to make it more easily crosslinkable, which adds to the expense and in some cases complexity of such systems. U.S. Pat. No. 4,552,215 to Almond, et al., discloses a cellulose ether which is chemically modified to incorporate pendant vicinal pairs of hydroxyl groups which assume or can assume cis geometry. These modified celluloses can be crosslinked by borate or zirconium (IV) metal ions and are useful for fluid loss control.

In SPE 29525, "A New Environmentally Safe Crosslinked Polymer for Fluid loss Control," pages 743-753 (1995), R. C. Cole, et al., disclosed a polymer which has been prepared by grafting crosslinkable sites onto an HEC backbone. The polymer can be transformed into a rigid, internally crosslinked gel if the pH of the solution is adjusted from acidic to slightly basic through the use of a non-toxic metal oxide crosslinker. As stated in SPE 29525, there are no divalent or trivalent metals associated with the polymer or included in its crosslinking chemistry.

This dispersion, acidification, hydration, and yielding of the polymer and the addition of salt may be carried out on location at the well-site where it is to be used, or it can be carried out at another location than the well-site. If the well-site location is selected for carrying out this step, then the hydrated and yielded polymer and the salt can immediately be dispersed in a brine, such as, for example, a 14.2 ppg $CaBr_2$-based brine, the crosslinkant activator can immediately be added, and the crosslinked product can immediately be emplaced in the well either through coiled tubing or through utilizing a process referred to as "bull-heading".

As mentioned above, the dispersion, acidification, hydration, and yielding of the polymer and the addition of salt may be carried out either on location or at a "pre-manufacture" site remote from the well-site. There, the hydrated and yielded polymer and the salt is dispersed in a brine, such as, for example, a 14.2 ppg $CaBr_2$-based brine, the crosslinkant activator is added, and the crosslinked product is packaged in 5-gallon buckets which are palletized and shipped to the well-site.

Regardless of where the crosslinked, salt-weighted, product is pre-manufactured, it may, optionally, be dispersed in a carrier fluid in the form of "chunks" of irregularly shaped crosslinked material, wherein said chunks have volumes on the order of ½ to 2 cubic inches. The carrier fluid for this process may be a brine, such as, for example, a 14.2 ppg $CaBr_2$-based brine, or any other brine, or, alternatively, it may be a viscosified brine, such as, for example, a 14.2 ppg $CaBr_2$-based brine containing a linear (i. e., un-crosslinked) polymer, such as, for example, HEC or any other "natural" or "synthetic" polymer. Once the slurry of chunks of crosslinked, salt-weighted, material in a brine or viscosified brine carrier fluid is created, it is immediately pumped down the well either through coiled tubing emplacement or "bull-heading".

The crosslinking is effected by the use of a slowly soluble, non-toxic metal oxide. The resulting crosslink fluid is said to demonstrate shear-thing-thinning and re-healing properties that provide for easy pumping. The re-healed gel is said to provide good fluid loss control upon placement. The polymer is referred to as a double-derivatized HEC (DDHEC). Instead of being a dry polymer in a bag, the DDHEC is a dispersion in an environmentally safe, non-aqueous, low-viscosity carrier fluid. The non-flammable carrier fluid is initially soluble in most brines. Hydration occurs only at specific, highly acidic conditions. At near neutral pH, the DDHEC polymer is dispersed into the mixing brine. When required, the pH is lowered, encouraging hydration and yielding of the polymer to rapidly occur.

U.S. Pat. No. 5,304,620 discloses a gel of a graft copolymer of a hydroxyalkyl cellulose, guar or hydroxypropyl guar prepared by a redox reaction with vinyl phosphonic acid. The gel is formed by hydrating the graft copolymer in an aqueous liquid containing at least a trace amount of at least one divalent cation. U.S. Pat. No. 5,439,057 discloses the use of a crosslinking agent comprising at least one titanium IV ions, zirconium IV ions, aluminum III ions, and antimony V ions to crosslink a polysaccharide polymer and form a gel.

In SPE 36676, "Development and Field Application of a New Fluid Loss Control Material," pages 933-941 (1996), P. D. Nguyen, et al., disclosed grating crosslinked, derivatized hydroxyethylcellulose (DDHEC) into small particulates kept in a brine solution. Details of the chemistry and properties of the un-grated crosslinked DDHEC were described in SPE 29525 discussed above.

In SPE 36676, crosslinked DDHEC was placed in a pressure chamber to which a perforated disk, cylinder or screen was attached to its end. Air was introduced at the other end of the pressure chamber to push the crosslinked material into and through the grating device and shredded. The shredded material is provided as a slurry concentrate and is said to be stable enough to store in this form. The slurry concentrate is then dispersed in a completion fluid.

U.S. Pat. No. 5,372,732 to Harris, et al., discloses a dry, granulated, delayed crosslinking agent for use as a blocking gel in a workover operation comprising a borate source and a water-soluble polysaccharide comprising at least one member selected from the group of guar gum, hydroxypropylguar and carboxymethylhydroxypropylguar. The blocking gel forms a relatively impermeable barrier cordoning off the production zone from the area undergoing the workover operation. The crosslinking agent is prepared by dissolving one of the water-soluble polysaccharides identified above in an aqueous solution. To the aqueous solution is added a borate source to form a crosslinked polysaccharide. The borate-crosslinked polysaccharide is then dried and granulated.

The delayed crosslinking agent is admixed with an aqueous gel containing a second-water soluble polysaccharide solution. As is well known in the art, the borate crosslink is a reversible crosslink in that the borate/polymer crosslinkage at basic pH is in equilibrium with the borate ion and polymer crosslink sites (i.e., cis-oriented hydroxyl groups), wherein the borate ion detaches from one site and then reattaches to another or the same site of the same or different polymer. Such crosslinked polymers are said to be self-healing since if the crosslink is broken it will reform at the same or different location. However, it is also known that HEC is not crosslinkable with borates. This is one reason why HEC has been derivatized by others to incorporate hydroxyl groups which can be in a cis orientation relative to one another so that borate-crosslinking can subsequently be initiated or derivatized by yet others to incorporate vinylphosphonate groups which can be crosslinked with the addition of magnesium oxide.

What is still needed, however, are improved fluid loss pills, especially those of greater density so that as fluid loss from the wellbore is occurring, the fluid loss pill can drop through the fluid in the well and sink towards and be drawn to the point of fluid loss or leakage from the wellbore into the formation, whereupon, if the fluid loss pill is a highly viscous, gelled or crosslinked, weighted pill, the fluid loss pill will lay across the rock face and seal off so that further fluid loss is prevented or minimized without the fluid loss pill penetrating to any significant extent into the porous medium comprising the petroliferous formation.

SUMMARY OF INVENTION

In one aspect, the present invention relates to a fluid loss pill that includes a crosslinked polymer gel, a brine, and solid salt particles disposed in said gel.

In another aspect, the present invention relates to a method for reducing fluid loss that includes pumping a selected amount of a fluid loss pill into a formation, the fluid loss pill including a crosslinked polymer gel, a brine, and solid salt particles disposed in said gel.

In another aspect, the present invention relates to a method for reducing fluid loss that includes pumping a selected amount of a fluid loss pill suspended in a brine or a viscosified brine into a formation, the fluid loss pill including a crosslinked polymer gel, a brine, and solid salt particles disposed in said gel.

Other aspects and advantages of the invention will be apparent from the following description and the appended claims.

DETAILED DESCRIPTION

In one aspect, the present invention relates to fluid loss control pills. In particular, embodiments of the present invention may use hydroxyethylcellulose polymers. More specifically embodiments of the present invention relate to fluid loss control pills known as "salt pills." However, in other embodiments, guars, derivatived guars, and other similar polymers known in the art may be used.

In the present disclosure, the term "salt pill" means a gelled polymer-containing system, which will be described in detail below, that has solid salt particles disposed in the gel. That is, the system may be thought of as a mixture of suspended salt particles in a gel matrix. Salts that may be used in accordance with embodiments of the present invention include both monovalent and divalent halide species. For example, LiCl, LiBr, LiI, NaCl, NaBr, NaI, KCl, KBr, KI, RbCl, RbBr, RbI, CsCl, CsBr, CsI, $MgCl_2$, $MgBr_2$, $CaCl_2$, $CaBr_2$, $SrCl_2$, $SrBr_2$, $ZnCl_2$, $ZnBr_2$, and mixtures thereof, and similar compounds which should be well known to those of skill in the art are all suitable salts that may be used in various embodiments of the present invention. These salts are selected first because of their low solubility in the gel matrix and second because of their high solubility in a subsequently applied mild acid solution used to un-crosslink the gel and sweep the pill away from the rock face.

Typical prior art salt pills, which were used as workover fluid pills, such as those disclosed in SPE 18384, involve seawater or freshwater systems that have been loaded (i.e., supersaturated) with various sized sodium chloride particles. In contrast, the present invention uses a viscous polymer gel as a matrix for suspending salt particles, which serves (among other functions) to increase the overall density of the salt pill.

Salt pills in accordance with embodiments of the present invention typically include a polymer with a crosslinking agent, salt particles, and a brine base. Each of these components are discussed below. Further, embodiments of the present invention also typically include an alcohol (such as methanol, ethanol, glycols, glycol monoalkoxy-ethers, monoalkoxy-ethers of glycol oligomers, etc. which are mixed with the polymer), an acid, and magnesium oxide or other suitable pH buffer. These latter components are discussed with reference to the mixing process.

Polymer/Crosslinking Agent

Embodiments of the present invention may use a number of "natural" polymers. Such polymers include HEC, derivatized HEC, guars, derivatized guars, starches, derivatized starches, seleroglucans, wellan gums, locust bean gum, karaya gum, gum tragacanth, carrageenans, alginates, gum arabic, and biopolymers, such as, for example that derived from fermentation with *xanthomonas campestris*, and other similar polymers.

Embodiments of the present invention may use a number of "synthetic" polymers, either exclusive of the aforementioned "natural" polymers or in combination therewith. "Synthetic" polymers include poly(ethylene glycol) (PEG), poly(diallyl amine), poly(acrylamide), poly(acrylonitrile), poly(vinyl acetate), poly(vinyl alcohol), poly(aminomethylpropylsulfonate[AMPS]), poly(vinyl amine), poly(vinyl sulfonate), poly(styryl sulfonate), poly(acrylate), poly(methyl acrylate), poly(methacrylate), poly(methyl methacrylate), poly(vinylpyrrolidone), poly(vinyl lactam), co-, ter-, and quater-polymers of the following co-monomers: ethylene, butadiene, isoprene, styrene, divinylbenzene, divinyl amine, 1,4-pentadiene-3-one (divinyl ketone), 1,6-heptadiene-4-one (diallyl ketone), diallyl amine, ethylene glycol, acrylamide, AMPS, acrylonitrile, vinyl acetate, vinyl alcohol, vinyl amine, vinyl sulfonate, styryl sulfonate, acrylate, methyl acrylate, methacrylate, methyl methacrylate, vinylpyrrolidone, vinyl lactam and other similar polymers.

In selected embodiments, crosslinked HEC and its derivates may be used to form the gel. In particular, in one embodiment ECF-680 may be used. ECF-680 is a slurry of a doubly derivatized hydroxyethyl cellulose in an inert, watermiscible carrier fluid, ECF-680 is available commercially from Special Products, Inc., a subsidiary of Champion Technologies, 3130 FM 521, Fresno, Tex. 77245, USA. DDHEC may be synthesized by grafting monomers of vinyl phosphonic acid (VPA) onto cellulose polymers according to methods disclosed in U.S. Pat. No. 5,304,620 (Holtmyer '620), U.S. Pat. No. 5,439,057 (Weaver '057), and U.S. Pat. No. 5,996,694 (Dewprashad '694). Those patents ('620, '057 and '694) are incorporated by reference in their entirety In order to form a suitable gel, whatever polymer—natural or synthetic—is used, typically a crosslinking agent must be added. In select embodiments, magnesium oxide is used as a crosslinking agent or as a crosslinking activator. One suitable form of magnesium oxide is a very fine powder is a highly reactive form, i.e., having small particle size, high surface area, and ready accessibility for reaction. One example of such a fine powder magnesium oxide is available commercially from M-I LLC under the trade name of DI-BAL-ANCE™. One useful feature of the magnesium oxide system is that the crosslinking does not occur immediately, but instead occurs over the course of several hours, leading to doubling of the apparent viscosity of the mixture during the first part of an hour and gradually increasing to about 50 percent of its ultimate value upon sitting for several hours at room temperature.

Alternatively, other polymers similar to DDEEC may be used (e.g., similarly modified cellulose, guar, or hydroxypropyl guar). Also, it will be obvious to one skilled in the art that other methods may be used to effect the same result—for example, applying a mildly complexed crosslinkant which becomes slowly un-complexed in order to effect the initial crosslinking, and subsequently applying a stronger complexing additive to effect the breaking (un-crosslinking).

Further, other compounds for crosslinking HEC may be used. For example, it is known that titanium or zirconium may be used to crosslink HEC. U.S. Pat. No. 6,342,467, for example, discloses one method for crosslinking HEC that involves the use of zirconium or titanium. Thus, the crosslinking agent can be any convenient source of zirconium ions. According to that patent, which is incorporated by reference in its entirety, a preferred crosslinking additive is a zirconium chelate such as zirconium lactate. Other suitable zirconium compounds include zirconyl chloride, sodium zirconium lactate and zirconium acetylacetonate. The delay agent is preferably the sodium counterpart of these zirconium compounds.

In addition, while specific mention is made of HEC and its derivatives in other embodiments, guars, derivatized guars, and other similar polymers may be used in accordance with embodiments of the present invention.

Salts

Salts that may be used in accordance with embodiments of the present invention include both monovalent and divalent halide species. For example, LiCl, LiBr, LiI, NaCl, NaBr, NaI, KCl, KBr, KI, RbCl, RbBr, RbI, CsCl, CsBr, CsI, $MgCl_2$, $MgBr_2$, $MgI_2$, $CaCl_2$, $CaBr_2$, $CaI_2$, $SrCl_2$, $SrBr_2$, $SrI_2$, $ZnCl_2$, $ZnCl_2$, $ZnI_2$, and mixtures thereof, and similar compounds which should be well known to those of skill in the art are all suitable salts that may be used in various embodiments of the present invention.

As discussed above, the salts are suspended in the polymer gel, as a solid. In select embodiments, the present inventions have discovered that reducing the particle size, increasing the uniformity of the particle size, and improving the quality of the mixing may increase performance of the resultant salt pills. It is important to note that the salt particles (which may be a combination of one or more of the salts above) may be added prior to, during, or after polymer gellation, whichever is most convenient.

Brines

Brines suitable for embodiments of the present invention include any solution useful in oil and gas well drilling systems and in similar applications, such as solutions used in drilling, producing and storing oil and gas from subterranean earth formations. The solutions typically contain metal salts, such as but not limited to, transition metal salts, alkali metal salts, alkaline earth metal salts, and mixtures thereof. Exemplary salts include halides of zinc, calcium, and mixtures thereof. For example, the solution can include zinc halide, such as zinc bromide or zinc chloride or both, optionally in combination with calcium bromide or calcium chloride or both. The brine solution can include the salts in conventional amounts, generally ranging from about 1% to about 80%, and preferably from about 20% to about 60%, based on the total weight of the solution, although as the skilled artisan will appreciate, amounts outside of this range can be used as well.

Further, embodiments of the present invention may further use "speciality" brines that include at least one alkali metal salt of a transition metal oxy-anion or polyoxy-anion, such as, for example, an alkali metal polytungstate, an alkali metal heteropolytungstate, an alkali metal polymolybdate or an alkali metal heteropolymolybdate.

Specifically, these specialty brine solutions (which are typically used in high temperature applications) comprise aqueous solutions of transition metal salts, wherein the aqueous solution contains anionic moieties having the formula $[A^{n+}B_mO_k]^{x-}$, where (A) is selected from group IV elements, group V elements, transition metal elements, and rare earth elements; (B) is one or more transition metal elements having an atomic weight between 50 and 201 inclusive, O is oxygen, m is an integer between 6 and 18 inclusive, k is an integer between 24 and 62 inclusive, and x is a small integer, typically between 1 and 10 depending on the selections of A, B, m, and k, and where the cations may be lithium, sodium, potassium, cesium, or a mixture thereof, or with a small amount of hydrogen cations provided by free acid anionic moieties, and especially where said salts are a major component of the solution and not merely an additive thereto. In particular embodiments of the present invention may use, the sodium, potassium, and cesium salts of the heteropolytungstates and the blends of these salts with the heteropolytungstic acids.

The heteropoly complex anions of transition metal elements can be generally described as coordination-type salts and free acids with a complex and high molecular weight anion. The heteropoly complex anions include as a ligand or complexing agent at least one transition metal atom which, as an ion in solution, exhibits corrosion inhibiting properties in oil and gas drilling systems. The heteropoly complex anions useful in the solutions of the invention also are preferably substantially completely soluble in brine solutions, so as to maximize the concentration of the corrosion inhibiting ions in solution. The heteropoly anions contain complexed transition metal atoms (such as Mo or W). Therefore, the dissolved heteropoly anions can provide a higher level of transition metal anions (Mo or W anions) in a solution, as compared to simple transition metal oxides, such as molybdates like lithium molybdate or tungstates like lithium tungstate.

Any of the heteropoly complex anions known in the art can be used, including compounds described in U.S. Pat. No. 6,004,475, the entire disclosure of which is incorporated herein by reference. Such complexes can be generally represented by the following formulas:

$[X_aM_bO_c]^{-n}$, $[X_aZ_dM_bO_c]^{-n}$, $[X_aZ_dM_bO_cH_e]^{-n}$, $[X_aM_bO_c(OH)_f]^{-n}$, and $[X_aZ_dM_bO_c(OH)_f]^{-7}$, wherein: X and Z are central heteroatoms from Groups I-VII of the Periodic Table of Elements; the value of a varies and is 1 or 2; the value of d varies and is an integer from 0 to 4;

$M_bO_c$, $M_bO_cH_e$, and $M_bO_c(OH)_f$ are oxoanions in which M is a transition metal element; the value of b varies, depending upon the number of transition metal atoms present in the oxoanion and can be an integer from 5 to 22, preferably 6 to 12; the value of c varies, depending upon the number of oxygen atoms present in the oxoanion attached to the transition metal and also capable of forming unique structural groups with the central atoms, and is an integer from 20 to 70, preferably from 24 to 40; the value of e varies (for example in the reduced heteropolyanion, the value of e varies depending upon the reduction of the heteropolyanion) and is an integer from 0 to 6; and the value of f varies and is an integer from 0 to 3; and n is the charge of the anion and is the sum of the charges on X, Z, M, O, H, and OH.

Although the above formulas are general representations of the heteropoly complex anions useful with embodiments of the invention, as will be appreciated by the skilled artisan, other compounds can also be included. Also as these formulas represent, in some heteropoly complex anions, H atoms in addition to the O atoms have been reported. Any of the various heteropoly complex anions known in the art can be used in the invention, including compounds described by G. A. Tsigdinos, Topics Curr. Chem., vol. 76, 5-64 (1978) and D. L. Kepert, Comprehensive Inorganic Chemistry (A. F. Trofman, et al.,) Oxford: Pergamon Press, vol. 4, pp. 607 (1973).

With regard to the central or heteroatom X, over 40 different elements (both metals and nonmetals) from Periodic Groups I-VIII can function as central atoms in distinct heteropoly complex anions. For example, X can be an elements selected from Groups IVB, VB, VIB, VIIB, VIII, IB, IIB, IIIA, IVA, and VA of the Periodic Table of Elements. Exemplary central atoms include, but are not limited to, ions of phosphorus, silicon, manganese, arsenic, boron, iron, tellurium, copper, zinc, aluminum, tin, zirconium, titanium, vanadium, antimony, bismuth, chromium, gallium, germanium, and the like.

M is a transition metal atom which, with its associated oxygen atoms, surrounds one or more central atoms X so that some of the oxygen atoms are associated with both M and X. The transition metal atom M is selected from those elements which as ions in solution provide corrosion inhibiting effect in oil and gas drilling systems. Preferably the transition metal element M in the oxoanion is derived from molybdate or tungstate. Other transition metal elements can also be present, as represented in the formula as Z, such as but not limited to, an element selected from Groups IVB, VB, VIB, VIIB, VIII, IB, IIB, IIIA, IVA, and VA of the Periodic Table of Elements. Exemplary elements include without limitation manganese, cobalt, nickel, copper, zinc, vanadium, niobium, tantalum, gallium, germanium, arsenic, antimony, bismuth, tellurium, and the like and other transition elements.

Exemplary heteropoly complex anions include, but are not limited to, phosphomolybdates, such as but not limited to, $[PMo_{12}O_{40}]^{-3}$, wherein $P^{+5}$ is the central atom or heteroatom, $[PMo_{10}V_2O_{40}]^{-5}$ and the like; silicon molybdates, such as but not limited to, $[SiMo_{11}NiO_{40}H_2]^{-6}$, wherein $Si^{+4}$ is the central atom; manganese molybdates, such as but not limited to, $[MnMo9O_{32}]^{-6}$, wherein $Mn^{+4}$ is the central atom; silicon tungstates, such as but not limited to, $[SiW_{12}O_{40}]^{-4}$, wherein $Si^{+4}$ is the central atom; tellurium molybdates, such as but not limited to, $[TeMo_6O_{24}]^{-6}$, wherein $Te^{+6}$ is the central atom; arsenic molybdates, such as but not limited to, $[As_2Mo_{18}O_{62}]^{-6}$, wherein $As^{+5}$ is the central atom; manganese niobiates, such as but not limited to, $[MnNb_{12}O_{36}]^{-12}$, wherein $Mn^{+4}$ is the central atom; and the like, and mixtures thereof. Preferred heteropoly complex anions are silicomolybdates, phosphomolybdates, silicotungstates, and phosphotungstates, or blends thereof with silicomolybdic acids, phosphomolybdic acids, silicotungstic acids, or phosphotungstic acids.

The heteropoly complex anions which have been structurally characterized can be divided into the broad groups, depending upon the heteroatom [X], transition metal atom [M] stoichiometry, and depending upon the coordination number of the heteroatom (that is, the number of points at which M is attached to the heteroatom in the complex). The heteropoly complex anions can be classified according to the ratio of the number of the central atoms to the peripheral molybdenum or other such atoms. For example, the different types of known heteropoly complex anions of molybdate show the following X:M ratio with one or more central atoms: X:M=1:12, 1:11, 1:10, 1:9, 1:6, 2:10, 2:17, 2:5, 4:12, 1 m:6 m (m unknown) and 1:1 heteropoly complex anions. The known tungstates include all of the above in addition to 2:18, 2:17 and 2:4:18.

In a preferred embodiment of the invention, the transition metal of the heteropoly complex anion is molybdenum or tungsten, and more preferably, molybdenum. A particularly preferred solution includes one or more of the heteropoly complex anions, $[PMo_{12}O_{30}]^{-3}$, $[PW_{12}O_{30}]^{-3}$, $[SiMo_{12}O_{40}]^{-4}$, and $[SiW_{12}O_{40}]^{-4}$, with one or more monovalent cations, such as, for example, $H^+$, $Li^+$, $Na^+$, etc. In a yet more particularly preferred embodiment, the brine includes one or more of the heteropoly complex anions, $[PMo_{12}O_{30}]^{-3}$, $[PW_{12}O_{30}]^{-3}$, $[SiMo_{12}O_{40}]^{-4}$, and $[SiW_{12}O_{40}]^{-4}$, with one or more mono-valent cations, such as, for example, $H^+$, $Li^+$, $Na^+$, etc., and the brine is pre-saturated with a mono-valent halide salt of the same composition as that which is selected to be disposed subsequently within the gel as a suspended salt.

For the preparation of a high density fluid loss pill, it is obvious that a high density base brine may be selected as a starting point for the formulation of the pill. The base brine should be selected from those which are compatible with the polymer/crosslinkant system which has been selected; or alternatively, the polymer/crosslinkant system should be selected from those which are compatible with the brine which has been selected. And finally, the salt may be selected from those which are relatively dense and highly soluble in dilute acid, formation waters, or fresh water and which are substantially insoluble in the selected base brine. Alternatively, the brine may be pre-saturated with the selected salt, thereby rendering any further added salt as substantially insoluble in the pre-saturated base brine.

In short, techniques in accordance with the above invention are believed to be useful in a variety of brines. The above listing is not intended to encompass all possible variants, as those of ordinary skill in the art will appreciate that other systems may be used without departing from the scope of the present invention.

EXAMPLES

Formulation 1, set forth in the table below, describes a system to which salt particles are added to achieve a desired end density, fluid loss effect. Those having ordinary skill in the art will appreciate that a number of different techniques may be used to measure fluid loss. As noted above, embodiments of the present invention relate to methods and formulations that provide effective fluid loss control.

For example, fluid loss tests of durations ranging from 30 seconds to 48 hours may be performed in an API standard high pressure, high temperature (HPHT) apparatus (Ref.: API 13-B1 with one modification: substituting an Aloxite or ceramic disk for paper). The testing temperature used in obtaining the below readings was predetermined, such as, for example, in accordance with a bottom-hole temperature at which the fluid will be used in the field.

The HPHT apparatus is typically operated at 500 psig differential pressure, using, for example, a nominally 65 millidarcy Aloxite disc (HPHT cell). In general, for the fluid lost tests, a 500 mL HPHT cell is loaded into the HPHT apparatus, which is then pressurized and heated to a predetermined temperature. A discharge valve located on the HPHT apparatus is then opened, and a filtrate volume is measured with respect to time. No limitation on the scope of the present invention is intended by the discussion of the above testing method.

| Formulation 1 | |
| --- | --- |
| ECF-680 | 14.00 lb/bbl |
| Conc. HCl | 1.25 lb/bbl |
| Propylene Glycol | 14.00 lb/bbl |
| MgO | 1.26 lb/bbl |
| 14.2 ppg $CaBr_2$ Brine | 549.70 lb/bbl |
| NaBr | 33.00 lb/bbl |

It will be apparent that the selected 14.2 ppg brine is dense, the selected polymer/crosslinkant system is compatible with it and the selected NaBr is dense and substantially insoluble in the 14.2 ppg brine, but readily soluble in dilute acid, formation waters, and fresh water.

One method for forming a salt pill in accordance with formulation 1 is now described. First, the ECF-680 (which is an DDHEC slurry) should be stirred to thoroughly re-disperse the polymer. Preferably, the slurry should be stirred with a hand held portable mixer until the slurry is smooth and the color uniform before adding the propylene glycol.

After stirring the slurry to re-disperse the polymer, the next step is to combine approximately equal weights of alcohol (in this case propylene glycol) and ECF-680 and stir to disperse the polymer and form a "pre-mix." This step aids in the initiation of polymer hydration. While reference is made to propylene glycol, those having ordinary skill in the art with recognize that a number of other alcohols (methanol, ethanol, ethylene glycol, glycol monoalkoxy-ethers, monoalkoxy-ethers of glycol oligomers, etc.) may be used. Preferably, mixing is continued until the slurry is smooth and the color uniform before adding to the completion brine.

After the pre-mix is formed, the required volume of brine is loaded into a blender. In this embodiment, 14.2 lb/gal $CaBr_2$ is used. Preferably, some brine is retained in order to make a slurry after the mixing. In selected embodiments, the pH of the brine is set to be between about 5 to about 7. The pH of brine can be adjusted with lime or hydrochloric or hydrobromic acid, as necessary.

To the brine, the pre-mixed ECF-680/propylene glycol slurry is added while circulating brine. In this embodiment, circulation and agitation is continued for about 10 minutes prior to adding hydrochloric acid. Next, the pH of the pill is adjusted to below 0.5 by using 33% hydrochloric acid. For safety concerns, it is recommended that only 1/6 gallon of acid be added per barrel brine at a time and allow at least 5 minutes mixing time before checking pH or proceeding with further additions.

Once the gel develops some viscosity (about 20-30+ cP at 300 rpm on a Fann 35), circulation through the centrifugal pump is discontinued, but slow agitation is continued. The ECF-680 is allowed to hydrate until fully hydrated and yielded as evidenced by no more visual change of gel viscosity in the blender. At this point, the fluid will typically look orange and be off-scale at 300 rpm on a Fann 35.

While allowing gel to hydrate, MgO should be prepared for addition to the gel. Using the brine set aside, prepare a 9:1 brine/MgO slurry. The addition of brine aids in dispersion of the crosslinker (or crosslink activator in this case, inasmuch as there are far more calcium ions than magnesium ions in the final pill, so the MgO should be considered as an activator which allows the pH to rise and enables the predominantly abundant divalent cations to effect the crosslink).

Once the ECF-680 polymer is fully hydrated, begin circulating the gel with the blender. While circulating, slowly add the MgO slurry into the blender. The jetting action of the circulating gel should help to evenly disperse the MgO slurry. If sufficient crosslinking has not begun to occur within 30 minutes, slurry an additional 25% more MgO for addition.

Crosslinking does not occur immediately, but over the course of several hours, leading to the doubling of the apparent viscosity of the mixture during these several hours. Thereafter the apparent viscosity of the mixture will continue to increased until it achieves its ultimate viscosity, that of a semi-rigid gel.

The salt particles (in this case NaBr) may be added at any stage during the above process, but most commonly will be added prior to the addition of a crosslinking agent, after adding some, but not all of the crosslinking agent (or crosslink activator), or after adding all of the crosslinking agent (or crosslink activator). In this example, the NaBr may be added after the full amount of MgO has been added. Based on the numbers set forth above, the resultant product will have an end density of approximately 15.2 ppg (pounds per gallon).

Density Control

One advantageous feature of the present invention is that by controlled addition of the salt particles, the ultimate density may be controlled. For example, fluid control pills in accordance with embodiments of the present invention may have densities ranging from 11 ppg to about 35 ppg depending on the volume fraction of salt particle and the salt density. Formulations 2-4 below illustrate this point.

| Component (in pounds per barrel) | Formulation 2 | Formulation 3 | Formulation 4 |
| --- | --- | --- | --- |
| ECF-680 | 14.0 | 14.0 | 14.0 |
| Concentrated HCl | 1.25 | 1.25 | 1.25 |
| Propylene Glycol | 12.95 | 12.95 | 12.95 |
| MgO | 1.26 | 1.26 | 1.26 |
| NaCl | 152.62 | N/A | N/A |
| NaBr | N/A | 33.0 | 194.75 |
| 14.2 ppg $CaBr_2$ | 431.2 | 533.9 | 447.9 |
| Resulting Density | 14.6 | 15.2 | 16.0 |

The above table illustrates that by controlling the amounts and nature of the additives, the desired end density of the salt pill can be achieved.

Moreover, within a given density a number of different salts may be used to achieve the desired density. For example, assuming a desired end product of approximately 16 pounds per gallon, based on a nominally 13.8 ppg polymer gel, the following salt volumes would be used to achieve a 16 ppg pill.

| Salt | Salt Density | Salt Volume Fraction |
|---|---|---|
| CsI | 37.64 | 0.092 |
| CsBr | 37.05 | 0.095 |
| CsCl | 33.28 | 0.113 |
| NaI | 30.60 | 0.131 |
| NaBr | 26.73 | 0.170 |
| KI | 26.12 | 0.187 |
| KBr | 22.95 | 0.241 |
| NaCl | 18.05 | 0.518 |
| KCl | 16.56 | 0.798 |

Advantageously, embodiments of the present invention may be used to create variable density fluid loss pills that can be pumped into wells to prevent the exit or entry of fluids into or out of underground formations. In particular, embodiments of the present invention advantageously provide a flexible, low cost, environmentally friendly system that is capable of significantly reducing or preventing fluid loss from occurring.

Advantageously, embodiments of the present invention may be used to create variable density fluid loss pills that readily are broken upon the application of relatively mild acid, such as, for example 10% hydrochloric acid or 20% citric acid, and some or all of the salt is readily soluble in said acid, while any remainder of broken gel and/or salt is readily removed upon washing over the rock face with fresh water or allowing a subsequent influx of formation fluids.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A fluid loss pill comprising:
   a crosslinked polymer gel matrix;
   a brine; and
   solid salt particles, wherein the solid salt particles are suspended in said crosslinked polymer gel matrix; and
   wherein the polymer, prior to crosslinking, is at least one vinyl phosphonic acid derivatized polymer, wherein the derivatized polymer, prior to derivatization, is selected from the group consisting of hydroxyalkyl cellulose, guar, hydroxypropyl guar, and starches, and
   wherein the crosslinked polymer gel matrix is crosslinked with at least one divalent cation.

2. The fluid loss pill of claim 1, wherein the solid salt particles consist of one or more salts selected from the group consisting of LiCl, LiBr, LiI, NaCl, NaBr, NaI, KCl, KBr, KI, RbCl, RbBr, RbI, CsCl, CsBr, CsI, $MgCl_2$, $MgBr_2$, $MgI_2$, $CaCl_2$, $CaBr_2$, $CaI_2$, $SrCl_2$, $SrBr_2$, $SrI_2$, $ZnCl_2$, $ZnBr_2$, and $ZnI_2$.

3. The fluid loss pill of claim 1, wherein the brine comprises an aqueous solutions of transition metal salts, wherein the aqueous solution contains anionic moieties having the formula $[AB_mO_k]^{x-}$, where (A) is an element selected from the group consisting of group IV elements, group V elements, transition metal elements, and rare earth elements; (B) is one or more transition metal elements having an atomic weight between 50 and 201 inclusive, O is oxygen, m is an integer between 6 and 18 inclusive, k is an integer between 24 and 62 inclusive, and x is a integer between 1 and 10.

4. The fluid loss pill of claim 1, wherein the pill has a density of about 11 ppg to about 35 ppg.

5. The fluid loss pill of claim 1, further comprising at least one of methanol, ethanol, glycol, ethylene glycol, glycol monoalkoxy-ethers, monoalkoxy-ethers of glycol oligomers, an acid, and a pH buffer.

6. The fluid loss pill of claim 1, wherein the fluid loss pill has a gel viscosity sufficiently high that the gel would measure off-scale at 300 rpm on a Fann 35 Viscometer when measured at room temperature.

7. The fluid loss pill of claim 1, wherein the crosslinked polymer matrix forms the continuous phase of the fluid loss pill.

8. A method for reducing fluid loss, the method comprising;
   pumping a selected amount of a fluid loss pill into a formation, the fluid loss pill comprising:
   a crosslinked polymer gel matrix;
   a brine; and
   solid salt particles, wherein said solid salt particles are suspended in the crosslinked polymer gel matrix; and
   wherein the polymer, prior to crosslinking, is at least one vinyl phosphonic acid derivatized polymer, wherein the derivatized polymer, prior to derivitization, is selected from the group consisting of hydroxyalkyl cellulose, guar, hydroxypropyl guar, and starches, and
   wherein the crosslinked polymer gel matrix is crosslinked with at least one divalent cation.

9. The method of claim 8, wherein the solid salt particles consist of one or more salts selected from the group consisting of LiCl, LiBr, LiI, NaCl, NaBr, NaI, KCl, KBr, KI, RbCl, RbBr, RbI, CsCl, CsBr, CsI, $MgCl_2$, $MgBr_2$, $MgI_2$, $CaCl_2$, $CaBr_2$, $CaI_2$, $SrCl_2$, $SrBr_2$, $SrI_2$, $ZnCl_2$, $ZnBr_2$, and $ZnI_2$.

10. The method of claim 8, wherein the brine comprises an aqueous solutions of transition metal salts, wherein the aqueous solution contains anionic moieties having the formula $[AB_mO_k]^{x-}$, where (A) is an element selected from the group consisting of group IV elements, group V elements, transition metal elements, and rare earth elements; (B) is one or more transition metal elements having an atomic weight between 50 and 201 inclusive, O is oxygen, m is an integer between 6 and 18 inclusive, k is an integer between 24 and 62 inclusive, and x is a integer between 1 and 10.

11. The method of claim 8, wherein the pill has a density of about 11 ppg to about 35 ppg.

12. The method of claim 8, further comprising at least one of methanol, ethanol, glycol, ethylene glycol, glycol monoalkoxy-ethers, monoalkoxy-ethers of glycol oligomers, an acid, and a pH buffer.

13. A method for forming a fluid loss pill, the method comprising:
   forming a pre-mix of polymer and alcohol;
   mixing a desired amount of brine with the pre-mix;
   adding solid salt particles; and
   adding at least one of a crosslink activator and a crosslinker comprising at least one divalent cation;
   allowing the at least one of a crosslink activator and a crosslinker to crosslink the polymer to form a gel matrix in which the solid salt particles are suspended; and
   wherein the polymer, prior to crosslinking, is at least one vinyl phosphonic acid derivatized polymer, wherein the derivatized polymer, prior to derivatization is selected from the group consisting of hydroxyalkyl cellulose, guar, hydroxypropyl guar, and starches.

14. The method of claim 13, wherein forming the pre-mix comprises mixing approximately a 1 to 1 ratio by weight of doubly derivatized hydroxyethylcellulose and glycol.

15. The method of claim 13, wherein the at least one crosslink activator comprises magnesium oxide.

16. The method of claim 13, wherein the desired amount of brine is selected such that the fluid loss pill has a density of about 11 ppg to about 35 ppg.

\* \* \* \* \*